United States Patent [19]

Lo

[11] Patent Number: 4,911,530

[45] Date of Patent: Mar. 27, 1990

[54] PHOTOGRAPHIC IMAGING SYSTEM FOR USE IN PRODUCING STEREOGRAPHS

[76] Inventor: Anthony Lo, 12A Olympian Mansion, 9 Conduit Road, Hong Kong, Hong Kong

[21] Appl. No.: 346,792

[22] Filed: May 3, 1989

Related U.S. Application Data

[63] Continuation-in-part of Ser. No. 5,889, Jan. 22, 1987, Pat. No. 4,844,583.

[30] Foreign Application Priority Data

Jan. 24, 1986 [GB] United Kingdom ............... 8601687

[51] Int. Cl.$^4$ .................. G02B 27/22; G03B 35/08
[52] U.S. Cl. .................................. 350/132; 354/112; 354/114; 354/117
[58] Field of Search ............... 350/132; 354/112, 114, 354/117, 94, 125

[56] References Cited

U.S. PATENT DOCUMENTS

| | | | |
|---|---|---|---|
| 2,495,288 | 1/1950 | Richards | 354/117 |
| 2,736,250 | 2/1956 | Rapritz | 354/117 |
| 3,815,970 | 6/1974 | Murphy | 354/117 |
| 4,844,583 | 7/1989 | Lo | 354/112 |

*Primary Examiner*—Bruce Y. Arnold
*Assistant Examiner*—J. P. Ryan
*Attorney, Agent, or Firm*—Finnegan, Henderson, Farabow, Garrett & Dunner

[57] ABSTRACT

A photographic imaging system for use in a stereographic camera for producing stereographs of a scene being viewed comprising a first set of reflective surfaces for directing light emanating from a scene being viewed along a first optical path. A second set of reflective surfaces directs light emanating from a scene being viewed along a second optical path. An aperture is provided, the first and second optical paths passing through the aperture. A shutter is provided for controllably opening and closing the aperture so that the light flux passing along the first and second optical paths is substantially equal. A holder is provided for holding a single frame of film, the single frame of film having a first portion of film and a second portion of film. A first lens, disposed along the first optical path, forms a first image substantially on the first portion of film and a second lens, disposed along the second optical path, forms a second image substantially on the second portion of film. The first and second images are formed side-by-side on the film and the first and second optical paths cross between the first and second lenses and the holder.

8 Claims, 7 Drawing Sheets

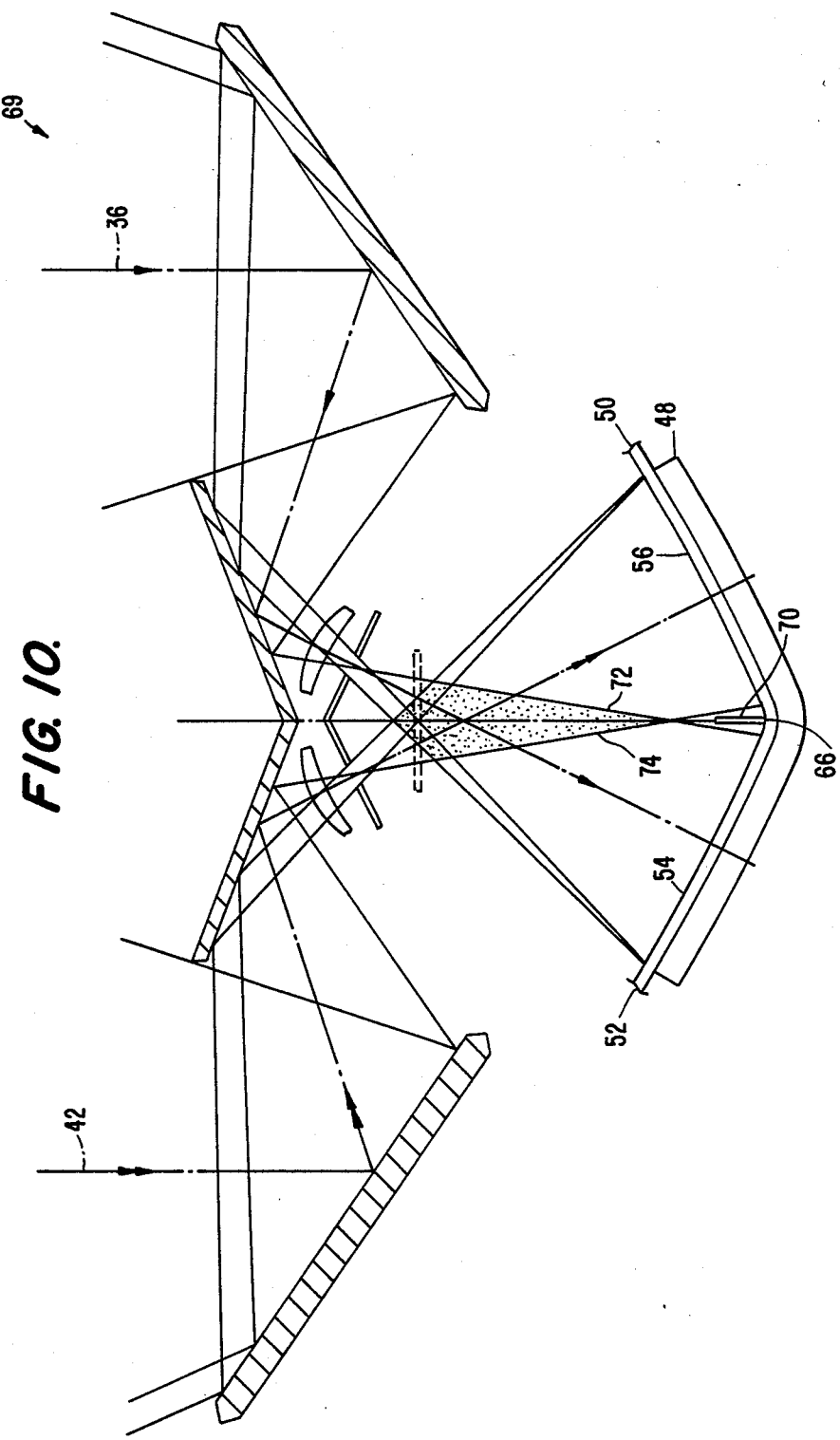

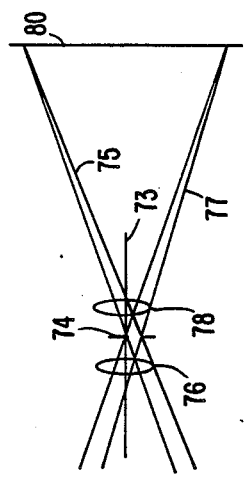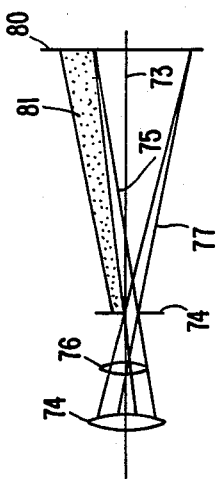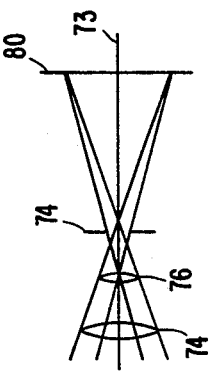

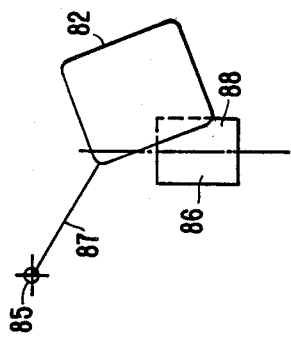
FIG. 15A.
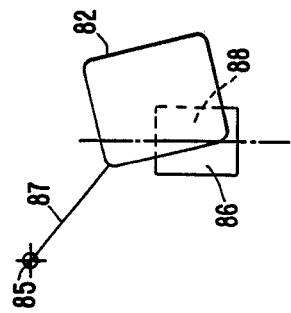
FIG. 15B.
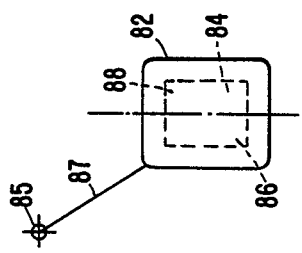
FIG. 15C.
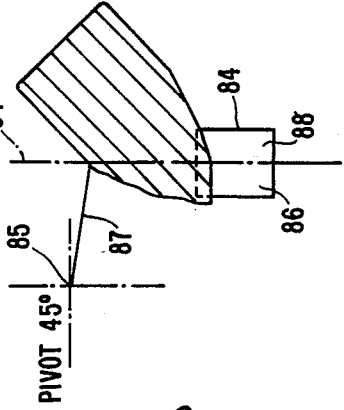
FIG. 16A. PIVOT 0°
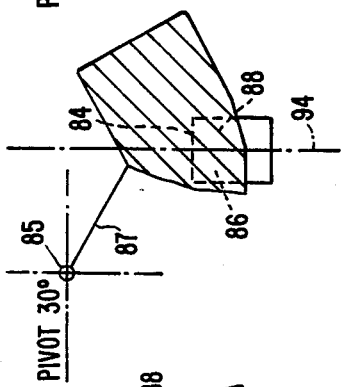
FIG. 16B. PIVOT 15°
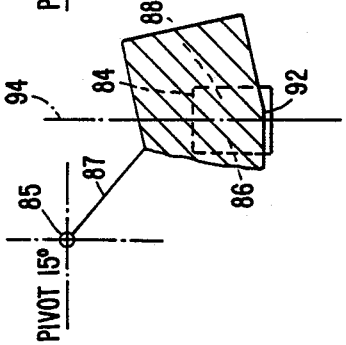
FIG. 16C. PIVOT 30°
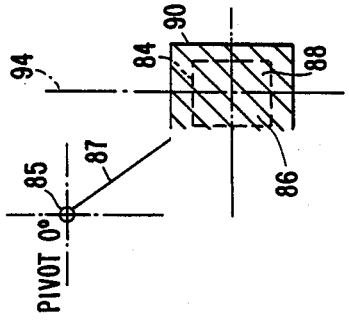
FIG. 16D. PIVOT 45°

PHOTOGRAPHIC IMAGING SYSTEM FOR USE IN PRODUCING STEREOGRAPHS

BACKGROUND OF THE INVENTION

This is a continuation-in-part application of U.S. patent application No. 005,889, filed on Jan. 22, 1987, now U.S. Pat. No. 4,844,583.

1. Field of the Invention

This invention relates to a photographic imaging system, for use in a stereoscopic camera or in a conventional camera, for producing stereographs.

2. Related Art

A conventional stereoscopic camera is designed to give two displaced images by means of two matched lenses and shutters, so that the images, when viewed with the separate eyes, give a stereoscopic reproduction of the object photographed. The two lenses are set apart by about the same distance as the eyes of a human. There are two kinds of stereoscopic cameras, one uses two camera lenses as stated above, in which case normal or wide angle pictures can be taken but the photographs from such a camera must be accurately aligned and mounted for viewing, and the second type uses a beam splitter, but in this case the angle of view is restricted, although the pairs of photographs are ready for viewing without the need for re-mounting.

The present invention provides an imaging system which has a normal or wide angle view and the negatives or slides are processed in the normal way and the results are ready for viewing without aligning or re-mounting.

The present invention further provides a shutter that ensures that the exposure of each of the pairs of photographs is substantially the same.

According to the present invention there is provided a photographic camera imaging system for use in a stereoscopic camera or in a conventional camera for producing stereographs, comprising a beam splitter having two pairs of reflective surfaces, each pair being disposed so as to direct an image through a lens so that two images are projected side-by-side onto a light sensitive recording medium. Further, a shutter is provided for controllably opening and closing the aperture of the imaging system so that the light flux passing to the two images is substantially equal.

BRIEF DESCRIPTION OF THE DRAWINGS

To the accomplishment of the foregoing and related ends, the invention comprises the features fully hereinafter described and particularly pointed out in the claims, the following description and annexed drawings setting forth in detail some illustrative embodiments of the invention, their being indicative however of only some ways in which the principle of the invention may be employed.

In said annexed drawings:

FIG. 10 shows a photographic imaging system including a vertical mask, FIG. 11 shows a lens couplet having an iris disposed between the lenses, FIG. 12 shows a lens couplet having an iris disposed between the lenses off the optical axis, FIG. 13 shows a lens couplet having an iris disposed between the couplet and the image plane, FIG. 14 shows a lens couplet having an iris disposed between the couplet and the image plane, the iris being disposed off the optical axis, FIGS. 15A, 15B, and 15C show a standard shutter arrangement, FIGS. 16A, 16B, 16C, and 16D show a shutter structure in accordance with the present invention.

DESCRIPTION OF THE PREFERRED EMBODIMENTS

Figure 1:
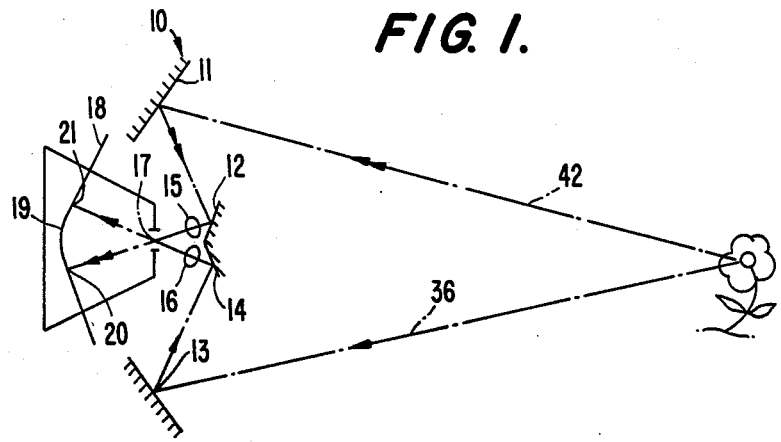
FIG. 1 is a diagramatic plan view of an imaging system according to the present invention.

In FIG. 1 there is diagramatically illustrated an imaging system for a stereoscopic camera comprising a beam splitter unit 10 having two pairs of reflective surfaces 11, 12 and 13, 14. Each pair of reflective surfaces 11, 12 and 13, 14 are disposed so as to direct an image through one of a pair of lenses 15 and 16. A simple shutter 17 is provided behind the lenses 15, 16 and the film 18 is positioned on a curved or angled film support surface 19.

The light paths are indicated by the broken lines provided with arrows and it will be seen that the image received by the pair of reflective surfaces 11, 12 is projected through the lens 15 and through the aperture controlled by the shutter 17 onto the film 18 at position 20, and the image received by the pair of reflective surfaces 13, 14 is projected through the lens 16 and onto the film 18 at position 21 so that two images are provided side-by-side on the film 18. The film 18 is angled so that at position 20, 21 it is at a right angle to the respective axes of the two lenses 15 and 16. The film 18 is processed in a conventional manner so as to produce negatives or slides and the printed pictures or slides are ready for viewing in a viewer without having to be aligned or re-mounted. Thus a conventional film 18 can be used for producing stereographs. The lenses 15 and 16 can be simple or compound lenses. Some of the reflective surfaces 11, 12, 13, 14 may be curved to act as a lens.

Figure 2:
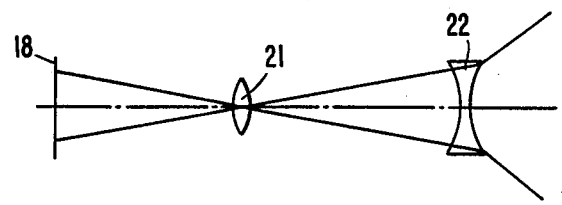
FIG. 2 shows the principle of a retro-focus lens.
Figure 3:
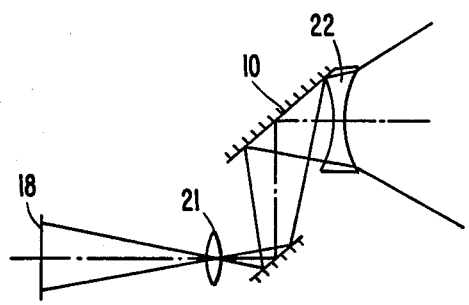
FIG. 3 shows the use of a retro-focus lens with a half beam splitter.

A further improvement in wide angle effect is possible by the use of retro-focus lenses as shown in FIGS. 2 and 3. These lenses have a positive lens 21 at the back and a negative lens 22 in front as shown in FIG. 2. The beam splitter unit 10 can be located between the lenses 21 and 22 as shown in FIG. 3 or behind the lens 21. By introducing the beam splitter 10 in between such a retro-focus lens provides a wide angle view with a compact beam splitter. FIG. 3 shows a half beam splitter 10.

Figure 4:
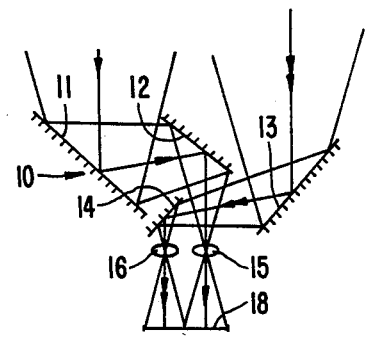
FIG. 4 shows the beam splitter with twin lens.
Figure 5:
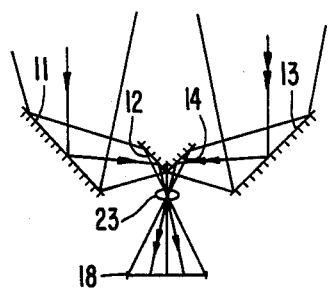
FIG. 5 shows the beam splitter with a single lens.

FIG. 4 shows a beam splitter 10 with an arrangement of reflective surfaces 11 to 14 which are different to those of FIG. 1, again twin lenses 15 and 16 are provided. FIG. 5 shows the beam splitter 10 as in FIG. 1 used with a single lens 23. In FIGS. 4 and 5 the film material 18 can be flat.

Figure 6:
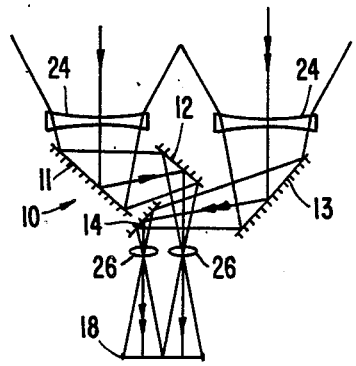
FIG. 6 shows retro-focus lenses combined with the beam splitter.

FIG. 6 shows the beam splitter 10 as in FIG. 4 combined with retro-focus lenses having front lens 24 and rear lens 26.

Figure 7:
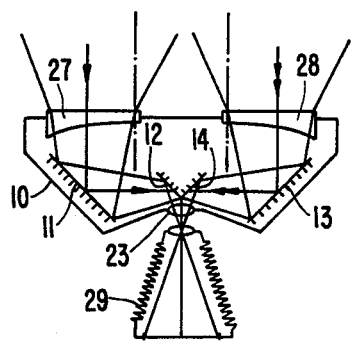
FIG. 7 shows an attachment for use with a conventional camera.

FIG. 7 shows a beam splitter 10 provided with two halves 27 and 28 of a diverging lens and which can be attached to a conventional camera 29 so as to project two images side-by-side onto the film. The arrangement enables a simple lens camera to be converted into a stereoscopic camera.

Figure 8:
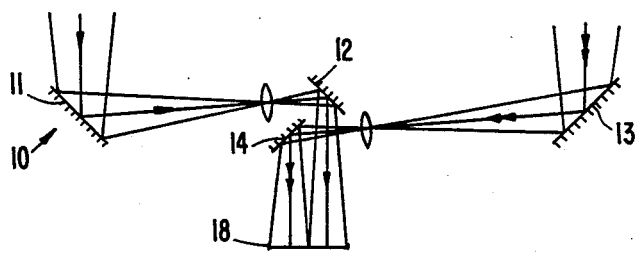
FIG. 8 shows telescopic lenses combined with the beam splitter.

FIG. 8 shows the beam splitter 10 combined with long lens focus lenses (telescopic). In this case the beam splitter 10 has a wide base.

Figure 9:
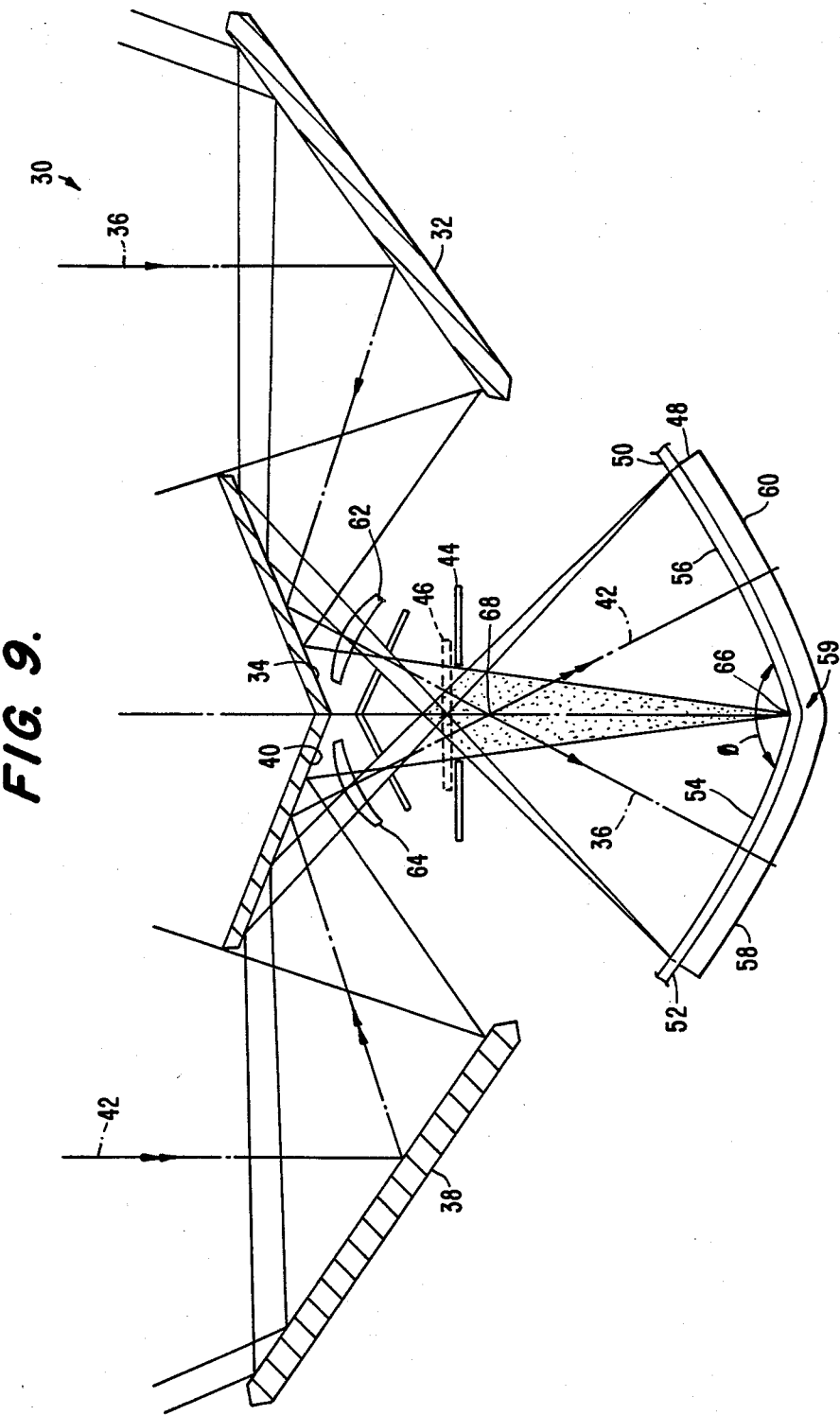
FIG. 9 shows a photographic imaging system in accordance with the present invention.

A photographic imaging system for use in a stereographic camera for producing stereographs of a scene being viewed in accordance with the present invention includes a first set of reflective surfaces for directing light emanating from a scene being viewed along a first optical path. As shown in FIG. 9, a photographic imaging system for use in a stereographic camera is provided and is designated, generally, by the numeral 30. Photographic imaging system 30 includes a first set of reflective surfaces 32 and 34 for directing light emanating from a scene being viewed, such as the flower illustrated in FIG. 1, along a first optical path 36.

In a photographic imaging system in accordance with the present invention, a second set of reflective surfaces is provided for directing light emanating from a scene being viewed along a second optical path. As shown in FIG. 9, photographic imaging system 30 includes a second set of reflective surfaces 38 and 40 for directing light emanating from a scene being viewed, such as the flower illustrated in FIG. 1, along a second optical path 42.

A photographic imaging system in accordance with the present invention also includes an aperture, the first and second optical paths passing through the aperture. As shown in FIG. 9, an aperture 44 is provided through which both first and second optical axes, 36 and 42, respectively, pass. Preferably, the aperture is disposed between the first and second lenses and the first and second portions of films, respectively. As shown in FIG. 9, the aperture 44 is disposed between first and second lenses, 62 and 64, respectively, and first and second portions of film 54 and 56, respectively. Also preferably, light emanating from the first lens and passing through the aperture falls incident only on the first portion of film and light emanating from the second lens and passing through the aperture falls incident substantially on the second portion of film. As shown in FIG. 9, first and second portions of film 54 and 56, respectively, are separated along a line 66. Aperture 44 is sized and oriented with respect to single frame of film 50 such that light emanating from the first lens 62 falls incident substantially on first portion of film 54 with little, if any, of the image crossing over line 66 and light emanating from second lens 64 falls incident substantially on second portion of film 56 with little, if any, of the image crossing over line 66. In practice, there is an overlap of the images formed on the first and second portions of film 54 and 56, respectively, at line 66 of approximately 1.5 mm, as measured on the single frame of film 50, when lenses 62 and 64 are f11 lenses.

An ideal camera mask, or aperture functioning as a mask, should be at the point of focus of an imaging system. It is for this reason that cameras tend to have the masking frame right next to the film. The term "ideal" mean the mask that provides the best defined edges and contrast on the film.

An alternative location and configuration for a mask would be a life size frame serving as a mask in the focus plane of the object. Such a mask would be large and difficult to manufacture and use. Even if it were possible to manufacture such a mask, it would be illuminated by stray light and is very difficult to make it jet black.

FIG. 10 is a photographic imaging system designated, generally by the numeral 69, that is substantially the same as photographic imaging system 30 of FIG. 9 with the exception that aperture 44 has been replaced by mask 70. Mask 70 is a plate that is disposed along line 66, extending outward from single frame of film 50. In such a photographic imaging system, where first optical path 36 and second optical path 42 cross between first and second lenses, 62 and 64, respectively, and holding means 48, masking by mask 70 on the single frame of film 50 at the line 66 between first portion of film 54 and second portion of film 56 will obscure part of one or both images (not shown) formed on the first and second portions of film 54 and 56, respectively. This is made clear upon reference to FIG. 10 where it is shown that mask 70 blocks perimiter rays 72 and 74 such that they do not fall incident on line 66, thus leaving a portion of each of first and second portions of film 54 and 56 unexposed.

In contrast, aperture 44 of FIG. 9 serves as a mask that will give a clean optical joint at line 66 between first and second portions of film 54 and 56, respectively. Aperture 44 has the advantage of being in the negative, or image forming side, of first and second lenses 62 and 64, respectively, where it is easy to mask off stray light, thus keeping aperture 44 mattblack. Further, aperture 44 is sited as near the focus, or negative, plane of first and second lenses 62 and 64, respectively, as possible without obscuring any image forming light rays.

Further still, aperture 44 has a further advantage of allowing a controlled amount of over-lap of first and second images (not shown) that fall on first and second portions of film 54 and 56, respectively. In this way, the exposure at the joint at line 66 can be similar to the rest of the photograph. This phenomenon can be appreciated by first considering only an image formed on a first portion of film 54 by first lens 62. If an image of an evenly lit grey surface is formed by lens 62 on first portion of film 54, mask or aperture 44 will cause a gradual vignetting of the image as the image approaches and then passes line 66 into second portion of film 56. The image of the grey wall will begin to appear to be dark grey and the fade to black approximately 0.8 mm into second portion of film 56 over line 66. The 0.8 mm of overlap is characteristic of an f11 lens used as first lens 62 in a system in accordance with the present invention. Since an image of a grey surface formed by second lens 64 on second portion of film 56 experiences the same effect, but in the opposite sense, the result is just like a "lap and dissolve" produced by double exposing a "fade in" and a "fade out" in a cinematographic film. The overlapping images along line 66 appear to be double exposed but, given an evenly lit scene being viewed, such as the flower of FIG. 1, the exposure is substantially uniform across the entire single frame of film 50.

This consistency of exposure across the single frame of film 50, including at line 66, is useful during processing of the single frame of film 50 for the following reasons. First, the single frame of film 50 will not be confused as including two half frames of film corresponding to the first and second portions of film 54 and 56, respectively, (typically, 18 mm×24 mm in size) and handled individually as separate, mono photographs. Second, with normal masking, the clear mask line down the middle of the negative or single frame of film will tend to fool a center-weighted auto exposure system of a color printer and treat the entire negative as underexposed. The auto exposure system will then compensate for this "perceived" under exposure and the compensation will make the print look pale.

A photographic imaging system in accordance with the present invention also includes shutter means for controllably opening and closing the aperture so that the light flux passing along the first and second optical paths is substantially equal. As shown in FIG. 9, shutter means 46 is provided. As explained more fully below, shutter means 46 functions to controllably open and close the aperture so that the light flux passing along first and second optical paths, 36 and 42, respectively, is substantially equal.

One object of shutter design is to provide a shutter that functions to evenly expose the picture area. The best position to achieve this is right in the middle of the lens where any part of the lens will illuminate the whole picture area. This is attained, as shown in FIG. 11, by situating an iris 74 between lenses 76 and 78. Iris 74 functions as a shutter by controllably opening and closing the opening through which the beams of light 75 and 77 pass. When the iris is situated as shown in FIG. 11, beams of light 75 and 77 pass through lenses 76 and 78 and illuminate the entire image plane or picture area 80.

Similarly, as shown in FIG. 12, an iris 74 that is offset from optical axis 73 will provide illumination for all of the image plane 80. As the iris 74 is moved axially away from the lens, it will act more and more like a mask. Thus, as shown in FIG. 13, iris 74 is dosposed between lens 76 and image plane 80 and the size of the image on image plane 80 is concomitantly reduced. As shown in FIG. 14, to the extent that the iris 74 is disposed off the optical axis 73, a portion of beam of light 75 will be obscured, as indicated by the area of shadow 81. Therefore to maintain even exposure, the shutter aperture or iris during exposure should be as symetrical in shape as possible about the optical axis.

In the case of a stereographic camera where a single shutter controls two lenses, the shutter cannot be placed as close to the lens as in a mono camera. FIG. 15A shows a simple shutter 82 disposed over an aperture 84 that is rotatable about a pivot 85. Shutter 82 is rotatively connected to pivot 85 through link 87. Aperture 84 is divided into two halfs, 86 and 88, respectively. Light propagating along first optical path 36, as shown in FIG. 9, will pass through first half 86 of aperture 84 and light propagating along second optical path 42, as shown in FIG. 9, will pass through second half 88 or aperture 84. It can be appreciated, upon having reference to FIGS. 15A, 15B, and 15C, that as shutter 82 rotates about pivot 85, the first half 86 of aperture 84 passes greater light flux than second half 88. Thus, first portion 43 of single frame of film 50 will be exposed more that second portion 56 of single frame of film 50.

FIGS. 16A and 16D show a shutter for the stereo camera in accordance with the present invention that produces a substantially even distribution of light flux through first and second halfs 86 and 88, respectively, of aperture 84 as shutter 90 pivots about pivot point 85. The shutter 90 shown in FIGS. 16A-16D includes a trailing edge 92 designed so that as shutter 90 pivots about pivot point 85 from the closed position of FIG. 16A (0° pivot position) to the open position of FIG. 16D (45° pivot position) trailing edge 92 is substantially at a right angle to the center line 94 of the mask. In this way, aperture 84 is symmetrical about the center line of the mask, and, although shutter 90 pivots, it acts like a guillotine sliding up and down along the vertical axis of the frame.

It should be noted that while FIG. 16D is designated as the "open position" the shutter 90 covers the aperture slightly. This slight covering of the aperture will not affect the operation of a photographic imaging system in accordance with the present invention provided that a substantially even distribution of light flux through first and second halfs 86 and 88 is achieved.

Figure 17:
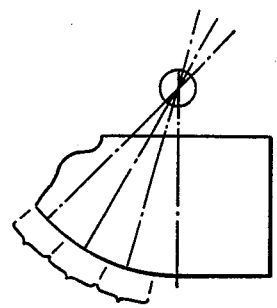
FIG. 17 illustrates a method for designing the trailing edge of a shutter in accordance with the present invention having a blended radius.
Figure 18A:
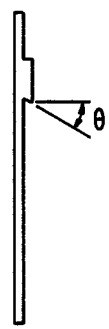
FIGS. 18A and 18B show a shutter in accordance with the present invention.
Figure 18B:
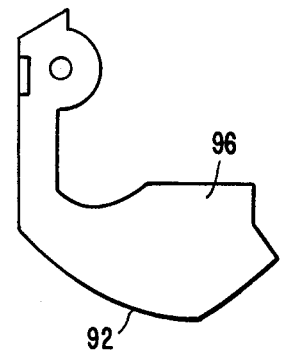

The locus of the curve for the trailing edge 92 of the shutter 90 was obtained by plotting a series of lines as the shutter pivots open and joining them up to form a smooth curve, as shown in FIGS. 16A to 16D. For ease of production of shutter 90 a radius on the trailing edge 92 is substituted to give a good approximate shape. The radius is achieved, as shown in FIG. 17, by finding the midpoint of each segment and constructing perpendicular lines to the midpoints of the segments. Where the perpendicular lines meet is the center of the blend radius. A most preferred embodiment is shown in FIGS. 18A and 18B, wherein shutter 96 has a trailing edge 92 that is a blended radius obtained as described in reference to FIG. 17.

A photographic imaging system in accordance with the present invention also includes holding means for holding a single frame of film, the single frame of film having a first portion of film and a second portion of film. As shown in FIG. 9, photographic imaging system 30 includes holding means 48 for holding a single frame of film 50, the single frame of film 50 preferably being part of a strip or roll of film 52. The single frame of film 50 includes a first portion 54 and a second portion 56. Holding means 48 preferably includes a first portion 58 contiguous with the first portion 54 of the single frame of film 50 and a second portion 60 contiguous with the second portion 56 of the single frame of film 50. Preferably, first and second portions of film 54 and 56, respectively, form an angle $\phi$ between them and, preferably, angle $\phi$ is an obtuse angle. Holding means 48 shown in FIG. 9 is shown in side view. As can be readily understood holding means and, hence, single frame of film 50, has a dimension that extends perpendicular to the plane of the paper upon which FIG. 9 is reproduced.

Preferably, the holding means bends the single frame of film along a bend to define the first portion of film and the second portion of film disposed on opposite sides of the bend. As shown in FIG. 9, holding means 48 assumes a generally arcuate shape so that the single frame of film 50, when held by holding means 48 bends along a bend 59 to define the first portion of film 54 and the second portion of film 56 disposed on opposite sides of the bend 59. Also preferably, the first optical path is substantially perpendicular to said first portion of film and the second optical path is substantially perpendicular to said second portion of film. As shown in FIG. 9, the first optical path 36 is substantially perpendicular to first portion of film 54 and second optical path 42 is substantially perpendicular to second portion of film 56.

A photographic imaging system in accordance with the present invention also includes a first lens disposed along the first optical path for forming a first image substantially on the first portion of film. As shown in FIG. 9, photographic imaging system 30 includes a first lens disposed along the first optical path 36 for forming a first image (not shown) substantially on first portion of film 54.

A photographic imaging system in accordance with the present invention also includes a second lens disposed along the second optical path for forming a second image substantially on the second portion of film. As shown in FIG. 9, photographic imaging system 30 includes a first lens disposed along the second optical path 42 for forming a second image (not shown) substantially on the second portion of film 56. Also in accordance with the present invention, the first and second images are formed side-by-side on the film and the first and second optical paths cross between the first and second lenses and the holding means. As shown in FIG. 9, the first and second portions of film 54 and 56, respectively, are contiguous with one another along a line 66. First and second images (not shown) are also substantially contiguous or side-by-side with one another along line 66. Further, first and second optical paths 36 and 42, respectively, cross at a crossing point 68 that is located between first and second lenses, 62 and 64, respectively, and holding means 48.

It will be apparent to those skilled in the art that various modifications can be made in the photographic imaging system of the present invention without departing from the scope or spirit of the invention. Thus, it is intended that the present invention cover the modifications and variations of this invention provided they come within the scope of the appended claims and their equivalents.

What is claimed is:

1. A photographic imaging system for use in a stereographic camera for producing stereographs of a scene being viewed, the photographic imaging system comprising:
    a first set of reflective surfaces for directing light emanating from a scene being viewed along a first optical path;
    a second set of reflective surfaces for directing light emanating from a scene being viewed along a second optical path;
    an aperture, said first and second optical paths passing through said aperture;
    shutter means for controllably opening and closing the aperture so that the light flux passing along the first and second optical paths is substantially equal;
    holding means for holding a single frame of film, said single frame of film having a first portion of film and a second portion of film;
    a first lens disposed along said first optical path for forming a first image substantially on the first portion of film; and
    a second lens disposed along said second optical path for forming a second image substantially on the second portion of film, the first and second images being formed side-by-by side on the film and the first and second optical paths crossing between the first and second lenses and the holding means.

2. A photographic imaging system for use in a stereographic camera as claimed in claim 1, wherein said holding means bends the single frame of film along a bend to define the first portion of film and the second portion of film disposed on opposite sides of the bend, said first optical path being substantially perpendicular to said first portion of film and said second optical path being substantially perpendicular to said second portion of film.

3. A photographic imaging system for use in a stereographic camera as claimed in claim 2 wherein said first and second portions of film define a desired angle therebetween.

4. A photographic imaging system for use in a stereographic camera as claimed in claim 3 wherein said desired angle is an obtuse angle.

5. A photographic imaging system for use in a stereographic camera as claimed in claim 1, wherein said first and second sets of reflective surfaces include a pair of reflective surfaces.

6. A photographic imaging system for use in a stereographic camera as claimed in claim 1, wherein the first lens is disposed between the first set of reflective surfaces and the holding means and the second lens is disposed between the second set of reflective surfaces and the holding means.

7. A photographic imaging system for use in a stereographic camera as claimed in claim 1 wherein said second optical path emanates from the scene being viewed at a desired angle of divergence from the first optical path.

8. A photographic imaging system for use in a stereographic camera as claimed in claim 1, wherein said aperture is disposed between the first and second lenses and the first and second portions of films, respectively, light emanating from the first lens and passing through the aperture falls incident substantially on the first portion and light emanating from the second lens and passing through the aperture falls incident substantially on the second portion.

* * * * *